April 16, 1968     R. G. STILES     3,378,017

DENTAL FLOSS APPLICATOR

Filed Oct. 23, 1965

INVENTOR.
ROBERT G. STILES

BY

*Richard K. Macneill*

United States Patent Office 3,378,017
Patented Apr. 16, 1968

3,378,017
DENTAL FLOSS APPLICATOR
Robert G. Stiles, 621 Margarita,
Coronado, Calif. 92118
Continuation-in-part of application Ser. No. 450,019,
Apr. 22, 1965. This application Oct. 23, 1965, Ser.
No. 503,427
5 Claims. (Cl. 132—92)

ABSTRACT OF THE DISCLOSURE

A dental floss applicator for applying dental floss to the teeth having a handle member for the storage of the spool of dental floss and a fork member inthreadably engaged therewith having channels for passing the floss up through the handle member a lower portion of the fork member and a channel through one of the prongs across the mouth of the fork member of one prong of the fork member to a second prong of the fork member back down through a channel and into the handle member, through the handle member to its base, the floss being stretched between the fork member and the handle member by its threadable engagement after which it can be loosened and pulled through from the base to expose a clean portion of floss between the two prongs and fork member.

---

The present invention relates to a dental floss applicator for applying dental floss to teeth, and more particularly to an improved dental floss applicator having built-in gum protection.

This application is a continuation-in-part of an application for a Dental Floss Applicator, Ser. No. 450,019 filed Apr. 22, 1965, now abandoned by Robert G. Stiles.

In the Dental Floss Applicator of my previous application, referenced above, difficulty has been encountered in the protection of the user's gums, i.e. until the user became somewhat skilled with the use of this invention, the tendency was to apply the floss with too great a pressure, resulting in the floss traveling between the teeth and into the gum area. This could result in some slight gum irritation, hence, the present invention for obviating this possible discomfort.

According to the invention, a cylindrical handle member is provided having an axial off-center bore therein for receiving a spool of dental floss. One end of the bore terminates in a smaller diameter bore for the passage of one end of the dental floss off the spool. Another bore of the same diameter as the smaller end of the first bore is provided also for the passage of dental floss. At one end of the handle member a threaded axial extension is provided for cooperation with the threaded bore in a fork member. The fork member terminates in two fork-like prongs, each having a small passage therethrough, again for the passage of dental floss. Another end of the fourth member terminates in a flange having two small bores therethrough for cooperation with the smaller diameter bores in said cylindrical handle member. In operation the dental floss is inserted in the large bore of the handle member, and the dental floss is threaded up through the smaller diameter bore, up through one of the smaller diameter bores in the fork member, through one of the prongs' passages, across to the other prong, down through the passage in the other prong, through the smaller diameter bore of the prong member and through the small bore of the handle member. During the threading operation the fork member is threadably engaged with the handle member but backed off a half turn with the two small bores of each member in alignment. When the threading is completed the two members are then tightened with respect to each other, i.e. the last half turn of the threadable engagement is made, which affects the stretching of the dental floss between the two fork-like members. This stretching is essential to insure the tautness of the exposed portion of dental floss between the two prongs for application between the teeth of the user. A keying means can be utilized for insuring that the bores in the base of the fork member and the bores in the handle member are in alignment during threading. After use the two members are backed off a half turn with respect to each other lining up the two bores in each member and the exposed dental floss is then pulled through and cut off at the bottom of the handle member. The two members are then tightened with respect to each other leaving an exposed portion extremely taut and ready for the next use. A resilient member is placed or positioned between the two fork-like prongs having an edge spacially disposed but in proximity with the exposed portion of floss. This is to prevent the floss from traveling between the teeth into the gum area causing irritation to the user, i.e., the resilient member's edge will catch on the teeth of the user preventing any further travel of the floss.

An object of the present invention is the provision of a dental floss applicator which exposes a taut segment of dental floss for use.

Another object is to provide a dental floss applicator in which a used portion can be easily removed and a fresh taut portion of dental floss is provided for the next use.

A further object of the invention is the provision of a dental floss applicator having a gum protection feature.

Yet another object of the invention is the provision of a dental floss applicator which is economical and simple to construct and use.

Other objects and many of the attendant advantages of this invention will be readily appreciated as the same becomes better understood by reference to the following detailed description when considered in connection with the accompanying drawing in which like reference numerals designate like parts throughout the figures thereof, and wherein.

Figure 1:
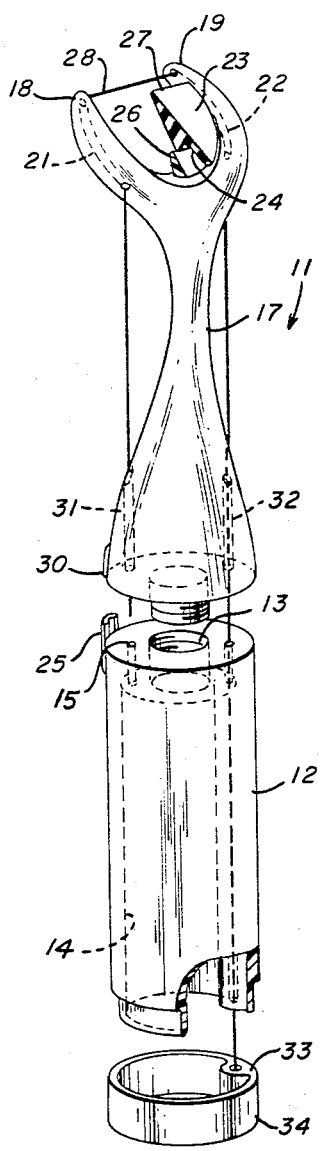
FIG. 1 is an exploded view of the applicator in perspective.

Referring to FIG. 1, an applicator is shown generally at 11 having a handle portion 12 with a threaded bore 13, a bore 14 and a bore 15 communicating with bore 14.

Fork member 17 has prongs 18 and 19 with passages 21 and 22 respectively. Resilient member 23 has a recess 24 which cooperates with wedge 26 in between prongs 18 and 19. Surface 27 of resilient member 23 is spacially disposed and parallel with dental floss 28 which is threaded from a spool in bore 14 and smaller bore 15 up through bore 31 of fork member 17, passage 21 of prong 18, passage 22 of prong 19 and bore 32 of fork member 17 down through bore 16 of handle member 12 and bore 33 of cap 34.

Figure 2:
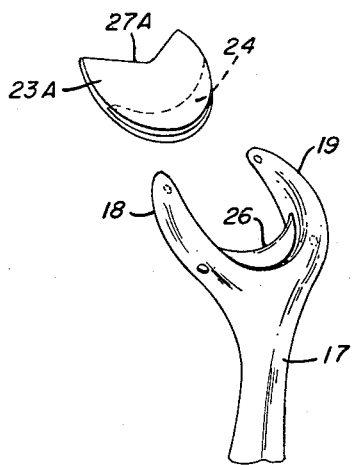
FIG. 2 is an exploded view in perspective of a modification of the embodiment of FIG. 1.

Referring to FIG. 2, fork member 17 is shown having prongs 18 and 19 with wedge 26 fitting therebetween. Resilient member 23a has a recess 24 cooperating with wedge 26. Surface 27a of resilient member 23a is V-shaped.

Figure 3:
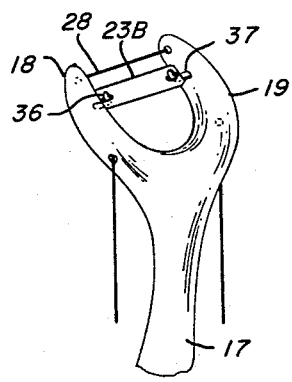
FIG. 3 is a perspective view of a modification of the embodiment of FIG. 1 and FIG. 2.

Referring to FIG. 3, fork member 17 has prongs 18 and 19 with floss 28 stretched therebetween. Mounting extensions 36 and 37 on prongs 18 and 19, respectively, carry resilient band 23b parallel to and spacially disposed from floss 28.

Referring back to FIG. 1, the applicator operates essentially the same as in my prior referenced application with the exception of three features. The first feature is the utilization of resilient member 23 which is preferably moulded of hard rubber for the protection of the gums of the user, i.e., surface 27 limits the travel of floss 28 between the teeth so that it cannot reach the gums of the user, obviating the possibility of irritation or damage thereto. The second improvement is exposing of floss 28 between passages 21 and 22 and bores 31 and 32. This facilitates an ease in the initial threading operation from the spool located in bore 14 of handle 12 up through the fork member 17 and back down through handle member 12. It further allows the user to pinch the exposed portion with his fingers resulting in an even greater tautness between prongs 18 and 19 of floss 28. The third improved feature is the utilization of keying members 25 and 30 which insure the axial alignment of bore 15 with bore 31 and bore 16 with bore 32 when the floss is initially threaded and being pulled through for the exposing of a clean portion between prongs 18 and 19.

Referring to FIG. 3, a modification of resilient member 23 is shown at 23a having a V-shape surface 27a. This would allow a variance in the distance between the top surface 27a of resilient member 23a and the dental floss, since all consumers would not have the same teeth of the same dimension.

A further modification is shown in FIG. 3 where the resilient member 23a has been replaced by a resilient strip 23b This again could be constructed of rubber and is held by mounting extension hooks 36 and 37 on prongs 18 and 19 respectively. This strip 23b could be replaced by a heavy rubber band if so desired.

It should be understood, of course, that the foregoing disclosure relates to only a preferred embodiment of the invention, and that it is intended to cover all changes and modifications of the example of the invention herein chosen for the purposes of the disclosure which do not constitute departures from the spirit and scope of the invention.

What is claimed is:
1. A dental floss applicator comprising:
a clyindrical handle member having at top end terminating in a first flange;
said cylindrical handle member having a first bore, said first bore being in communication with a bottom end thereof;
a spool of dental floss carried within said first bore, said cylindrical handle member having a second bore therethrough in proximity to the periphery thereof having dental floss from said spool of dental floss passing therethrough;
said cylindrical handle member having a third bore diamaterically opposed from said second bore and equidistant from a transverse axis of said cylindrical handle member, said third bore being in communication with said first bore and having dental floss from said spool of dental floss passing therethrough;
a fork member, said fork member having one end terminating in first and second prongs and another end terminating in a second flange;
said another end having fourth and fifth bores therein, having said dental floss passing therethrough, said fourth and fifth bores being positioned for axial alignment with said second and third bores in a plurality of pre-determined relative positions of said cylindrical handle member and said fork member;
said first and second prongs each having a passage therein with said dental floss passing therethrough and being positioned for cooperation with said fourth and fifth bores, respectively; and
said handle member and said fork member being threadably engaged in the center portions of said first and second flanges to within 180° of a snug engagement after insertion and passage of said dental floss, whereby said cylindrical handle member and said fourth member can be further threadably engaged to a snug position thereby stretching said dental floss to maintain a taut section between said first and second prongs.

2. The dental floss applicator of claim 1 and further including a resilient member positioned between said first and second prongs.

3. The dental floss applicator of claim 2 wherein said resilient member comprises an insert having a recess therein and said resilient member has an expansion position between said first and second prongs for cooperation with said recess.

4. The dental floss applicator of claim 3 wherein said insert has a surface spacially disposed from the ends of said first and second prongs, said surface being substantially V-shaped.

5. The dental floss applicator of claim 2 wherein said resilient member comprises a rubber strip mounted between extension hooks on said first and second prongs.

References Cited

UNITED STATES PATENTS

| 756,138 | 3/1904 | Peterson | 132—84.1 |
| 788,947 | 5/1905 | Roth | 132—91 |
| 2,644,452 | 7/1943 | Brown | 128—272 |
| 2,872,930 | 2/1959 | Patterson | 132—92 |

FOREIGN PATENTS

| 267,060 | 3/1927 | Great Britain. |

LOUIS G. MANCENE, *Primary Examiner.*

RICHARD A. GAUDET, *Examiner.*

G. E. McNEILL, *Assistant Examiner.*